(12) United States Patent
Rao et al.

(10) Patent No.: US 6,791,469 B1
(45) Date of Patent: Sep. 14, 2004

(54) METHOD OF DRILLING IN RESPONSE TO LOOKING AHEAD OF THE BIT

(75) Inventors: M. Vikram Rao, Houston, TX (US); Paul F. Rodney, Houston, TX (US)

(73) Assignee: Halliburton Energy Services, Houston, TX (US)

(*) Notice: Subject to any disclaimer, the term of this patent is extended or adjusted under 35 U.S.C. 154(b) by 193 days.

(21) Appl. No.: 10/264,731

(22) Filed: Oct. 4, 2002

Related U.S. Application Data

(63) Continuation of application No. 09/537,445, filed on Mar. 27, 2000, now Pat. No. 6,480,118.

(51) Int. Cl.[7] .................................................. G01V 3/00
(52) U.S. Cl. ........................ 340/853.6; 175/26; 175/40; 175/41; 702/9; 181/102
(58) Field of Search .............................. 367/82; 175/40, 175/41, 50, 26; 340/853.6; 181/102, 106; 702/9

(56) References Cited

U.S. PATENT DOCUMENTS

| | | | |
|---|---|---|---|
| 6,023,443 A | * 2/2000 | Dubinsky et al. | 367/76 |
| 6,206,108 B1 | * 3/2001 | MacDonald et al. | 175/24 |
| 6,230,822 B1 | * 5/2001 | Sullivan et al. | 175/40 |
| 6,236,620 B1 | * 5/2001 | Schultz et al. | 367/82 |
| 6,490,527 B1 | * 12/2002 | Utt | 702/9 |
| 6,581,010 B2 | * 6/2003 | Dubinsky et al. | 702/9 |
| 6,648,083 B2 | * 11/2003 | Evans et al. | 175/41 |

* cited by examiner

*Primary Examiner*—Albert K. Wong
(74) *Attorney, Agent, or Firm*—Loren Helmreich; Browning Bushman, P.C.

(57) ABSTRACT

A method for improving ROP and reducing hazards in drilling subterranean wells by using an acoustical system 15 to look ahead of the drill bit 14, detects and analyzes geologic features ahead of the bit 14 which may be qualified as drilling hazards 17. Detection of such hazards 17 may facilitate use of more aggressively penetrating bits 14 such as PDC bits as opposed to roller cone bits. In addition, other drilling parameters may be adjusted to improve ROP due to the ability to timely respond to identified hazards 17 before they may be detrimentally encountered by the bit 14. The acoustic system 15 may look ahead of the bit 14 by at least 100 meters, using propagated acoustic waves 19 to locate changes in acoustic impedance which may represent drilling hazards 17. In addition, bulk resistivity ahead of the bit 14 may also be measured and used to locate drilling hazards 17. The measured properties of the investigated formation may facilitate optimizing the design and operation of a drilling program so as to improve the rate of penetration.

16 Claims, 3 Drawing Sheets

METHOD OF DRILLING IN RESPONSE TO LOOKING AHEAD OF THE BIT

This application is a continuation of Ser. No. 09/537,455 filed Mar. 27, 2000, now U.S. Pat. No. 6,480,118.

FIELD OF THE INVENTION

The present invention relates to the drilling of subterranean wells. Particularly, this invention relates to methods and equipment for acoustically looking ahead of the drill bit, while the well is being drilled, e.g., one-hundred meters or more, analyzing and interpreting the data to identify and predict formation characteristics and properties of geologic features and structures within the planned drill path before being penetrated, and in response thereto, optimizing drilling procedures and equipment. More specifically, the "look ahead" information may be utilized to cost effectively maximize rate of penetration (ROP) and mechanical efficiency of the drilling system through use of more effective and efficient drill bits and related equipment. The result is improved ROP as compared to use of less efficient bits or equipment which otherwise likely would have been used and reduced risk of incurring unanticipated drilling hazards.

BACKGROUND OF THE INVENTION

When drilling subterranean wells, whether for hydrocarbons, water or other minerals, it is usually desirable to understand and obtain useful working knowledge of the formations, strata, environmental and hole conditions that may be encountered when drilling the wellbore. The more of this information that is available prior to actually encountering the change in formation or the drilling hazard, the more effectively the drilling plan may be designed and if needed, modified during drilling to provide a more cost effective response, efficiently drilled wellbore and safer drilling operation. The range of uncertainty in these conditions varies considerably from relatively low uncertainty in areas that have significant historical drilling data which may have been obtained from previous regional drilling experiences, to very high uncertainty in (a) exploratory wells, (b) wells in geologically complex formations, and (c) when drilling into previously unpenetrated horizons, such as when deepening a well. When drilling in areas of high uncertainty or risk the quality and quantity of useable information becomes more critical in optimizing the drilling program.

Techniques and equipment have been developed to gather and make available such information to improve drilling planning, efficiency and safety, including information gathered on both a macro and micro scale before the well is drilled and information gathered in real time, and while the well is being drilled. Room for improvement remains, however, in the quality, precision and timeliness of gathering and interpreting information so as to effect desirable improvements in a drilling program. Advances in measurement while drilling (MWD) equipment and seismic techniques are improving drilling efficiency and well quality, however, limitations remain which often result in economic and mechanical losses in drilling efficiency. Traditionally the vast majority of the information used in planning and drilling a well is obtained and analyzed prior to drilling. Once drilling has begun, relatively few changes are made in the drilling plan because the original plan is typically conservatively over-designed to account for reasonably anticipated but still unidentified drilling hazards, usually resulting in less than optimum ROP. One reason for this is that while drilling a well, relatively little additional information is gathered which may be useful in timely predicting unexpected changes in environment or formation characteristics before the changes are actually encountered. Unnecessarily accelerated bit wear or premature bit destruction may be avoided under prior art by employment of more mechanically conservative, less aggressive cutting bits.

Under the prior art it is difficult if not impossible to identify unexpected or previously unforeseen changes in geology, structure, stratigraphy, pore-pressure, rock matrix, faults, formation consolidation or other environmental alterations or hazards that the drill bit may encounter, with sufficient lead time before these events are actually experienced so as to timely implement prudent changes in the drilling program, including changing the bit selection. The inability to timely identify the presence and location of these formation changes may prevent improvement modifications in the drilling program, e.g., modifying bit selection, drill string and downhole assembly design, weight on bit, rotational speed (rpm) and determination of whether to rotate the drill string or "slide" drill utilizing a downhole motor. Failure to implement these and/or other modifications to the drilling program parameters often results in increased drilling time and costs through decreased ROP, a lower quality wellbore, less than optimal control of formation damage and decreased safety while drilling.

The prior art is incapable of fully effecting the desired improvements in optimizing the drilling program. The prior art is deficient in timely, precisely and confidently determining the numerous formation rock and pore properties which exist ahead of the bit in order to avoid excessive over-design of the drilling program. For example, it is generally accepted that in soft to medium-hard formations, polycrystalline diamond cutter (PDC) bits usually yield the best ROP. These bits are also among the more expensive. If an unexpected hard stringer or formation is encountered by a PDC bit, the PDC bit may be quickly destroyed or incur accelerated wear and damage. Thus, an improperly designed component in the drilling program, such as an improperly selected bit can result in excessive delays and costs, including rig time to pull the pipe out of the hole (trip), change bits and run the pipe back to bottom. Pieces of the destroyed bit may also have to be "fished" out of the hole before drilling may be continued, thereby resulting in additional "trips" and significant costs.

An additional important parameter in controlling well costs and well quality is pore pressure determination. Identification of the presence of over-pressured or under-pressured zones should be made before they are encountered by the bit. Over-pressured zones can result in loss of well control, potentially leading to loss of the well, the drillstring, the drilling rig and possibly human life. Under-pressured zones can result in loss of costly drilling fluid, formation damage, loss of well control, stuck pipe and loss of the drill string or the well.

Proper planning is important in avoiding drilling hazards in the most cost-effective manner and in maximizing drilling ROP efficiency. Proper planning, however, requires timely, sufficiently detailed, useable information. Historically, an over-designed drilling plan and inflated equipment safety factors are typically built into a well plan to mitigate the effects of unforeseen hazards, often resulting in excessive and usually significant additional costs. Timely, useable information is valuable in optimizing a drilling program and the advantages may be reflected throughout the many costs included in drilling a well.

Techniques are known which use acoustic signals to gather and process data while drilling that relate to either recently drilled formations or undrilled formations within close proximity of the drill bit or to information pertaining to the drill string and downhole conditions thereof. One common technique is to gather three-dimensional seismic data at the surface or at sea before drilling the well in an attempt to map and identify relatively significant subsurface features, as disclosed for example in U.S. Pat. No. 5,555,531. This method may also include preparing high resolution three-dimensional vertical profiles from the data, preparing an artificially-illuminated and rendered surface based on the data, potentially identifying significant reflective subsurface features, including those which may be hazardous. However, with increasing depth of investigation these seismic methods may suffer decreasing resolution and cumulatively increasing error. In addition, although seismic while drilling techniques are known, seismic is typically not utilized once drilling begins.

A known method of obtaining formation information while drilling is using seismic pulse generators. Seismic pulse generators have been used to obtain data on formations at relatively the same depth as the drill bit and also to look ahead of the drill bit as seen in U.S. Pat. No. 4,207,619. That patent discloses the use of numerous sensors arranged in symmetrical array on the surface, thereby resulting in significant additional expense, complexity and time to deploy the sensors, retrieve and then process the data. This can be additionally problematic in offshore drilling, where there is often a great distance between the surface of the water and ocean floor.

Another system using an acoustic transducer in drilling applications is disclosed in U.S. Pat. No. 5,798,488. That system preferably utilizes an acoustic transducer system which is integrated into the MWD tools of the drill string and generates acoustic signals in the rock ahead of the bit by vibrating the drill bit and the attached masses on the lower end of the drill string. The patent discloses an embodiment where the acoustic transducer is made as an integral part of the bit. In either embodiment, drilling is paused and the acoustic transducer may be electrically vibrated, thus propagating acoustic waves through the drill bit and into the formation ahead of the bit. The reflected acoustic signals may be collected by the same transducer that generated the signal. U.S. Pat. No. 5,798,488 discloses that it is desirable when drilling for oil to know what strata may lie ahead of the bit in order to allow the most appropriate drilling parameters to be employed, to know the location of the bit relative to anticipated or known rock features and to identify over-pressure and under-pressure regions. It fails, however, to disclose a method to enhance rate of penetration and extend bit life.

In other prior art commonly known as MWD or LWD (logging while drilling), instruments are known in which may be positioned within the drill string as part of a bottom hole assembly and which may generate and record acoustic signals. Measurements may be made either while drilling or during brief intermissions in drilling and may provide useful information in evaluating drilling and formation characteristics such as bit location and direction, hole deviation and weight on bit. These measurements may facilitate evaluation of various formation and rock properties such as bed boundaries, porosity, resistivity and natural radioactivity measurements. MWD and LWD have proven to be useful for improving the quantity and quality of information pertaining to environmental properties or operating parameters in or around the vicinity near the wellbore and are generally limited to formations which have been penetrated by the bit. As measurements are made, the MWD or LWD system typically transmits the data in real-time to the surface or may store the data for later transmittal to the surface, or the system may process the data downhole and then transmit a processed signal. The scope of investigation and measurement with these types of instruments or tools is typically limited to inside or near well-bore evaluation. Most often, MWD or LWD measurements may be obtained for a formation or geologic feature after that formation or feature has been penetrated by the bit, or where the geologic feature is located within close proximity to the bit or measuring tools in drill string.

This prior art, however, fails to provide for drilling program improvements, which may safely increase the rate of penetration and bit life. Applications are desired that investigate formation characteristics sufficiently far ahead of the bit such that drilling hazards may be predicted and avoided and drilling opportunities identified and exploited, such that ROP may be increased by selecting the optimum bit and refining the related drilling parameters in order to avoid excessive over-designing.

SUMMARY OF THE INVENTION

The present invention provides a method for improving ROP and drilling efficiency by acoustically investigating or looking ahead of the drill bit to detect and analyze geologic features ahead of the bit which may be qualified as drilling hazards. A drilling hazard, as the term is used herein, may not necessarily be dangerous or inherently destructive to drilling equipment but rather may be a geologic or environmental feature which could potentially impose detrimental effects upon drilling system performance, hole quality or drilling equipment, including those effects which may be inherently destructive. The methods of this invention utilize computer interpretation of acoustic information obtained by acoustic, electric and/or mechanical instruments and tools which may be integrated partially or wholly into the bottom hole assembly of the drill string and which may also be partially located at the surface. A technique for transmitting data or information from downhole to the surface may also be included. This invention pertains generally to methods for application or use of the calculated "look ahead" information to improve the decision making process with regard to implementing changes in the bit, downhole assembly or related drilling parameters to timely and prudently respond to identified potential hazards such that the ROP for the well may be improved as compared to the ROP which would be possible without the ability to look ahead of the bit.

It is an objective of this invention to provide a method that uses an acoustic system to locate, analyze and display the type of hazard, range and relative direction from the drill bit to the hazard. The acoustic system utilized by the methods of this invention may provide an acoustic "look ahead of the bit" and predict drilling hazards at least one-hundred (100) meters ahead of the bit with a resolution capability to identify and project hazards having a thickness of at least one (1) meter in thickness. The hazards may be detected as variations in acoustic impedance. The acoustic system should propagate acoustic signals and detect formations or hazards with strong acoustic contrasts, such as hard stringers, having a thickness of at least one (1) meter relative to less hard adjacent shoulder beds, thereby facilitating use of the methods of this invention. Other hazards may also be identified which may detrimentally effect ROP, including extremely soft or gummy formations such as "gumbos" or coal beds, such that bit selection, hydraulics, mud properties or other drilling parameters maybe appropriately adjusted to accommodate the existing bit before bit balling and pipe sticking or other ROP hindering problems may be encountered.

The methods of this invention may utilize an acoustic tool and related equipment, which propagates an acoustic wave at frequencies in the neighborhood of a few kilohertz. Compression and shear waves may both be propagated and evaluated. Acoustic wave properties in geologic formations are functions of numerous variables including porosity, rock matrix composition, overburden stress, pore pressure, temperature, fluid properties and grain texture. The acoustic waves may be slowed, distorted, elastically absorbed and reflected as they encounter variations in acoustic impedance, which may contrast with the impedance of preceding formations. The reflected signal may be received by some acoustic receiver arrangement and then transmitted to the surface for analysis or analyzed downhole, to project an acoustic visualization of the formation and geologic characteristics that may exist within the zone of acoustic investigation ahead of the bit. It is a feature of this invention to preferably use an acoustic system that combines the transmitter and receiver at a generally common location and eliminate the need to place receivers in multiple locations along the drill string.

The methods of this invention use the ability to project drilling hazards as a means to add net value to well economics by improving the ROP from two perspectives. First, it may permit adjustment of drilling equipment and parameters while the well is drilling. Second, this invention may permit application of more aggressive and efficiently designed drilling equipment and parameters in the planning stages of the well through reduced over-design due to unidentified hazards. Benefits from both perspectives may combine to improve the ROP.

The ROP improvements sought are "net" ROP improvements, meaning improved drilling time over the entire course in which the look ahead system may be employed. It is possible that an alteration in a drilling parameter over a specific interval, in response to a detected hazard, may result in a temporary decrease in ROP as compared to the ROP which may have been obtained over that same interval using prior art equipment. For example, in utilizing a relatively expensive PDC bit, when a detected hard stringer is to be encountered, in lieu of changing to a hard rock roller cone button bit, WOB and RPM may be reduced such that the PDC bit may slowly cut that section carefully and deliberately in order that the PDC bit is not unacceptably damaged. However, over the course of the entire section drilled by the PDC bit, the overall ROP may be greater than the ROP that may have been achieved using prior art methods. With the methods of this invention, unanticipated hard stringers such as cherts, hard sandstones or hard dolomites may be timely identified, facilitating prudent bit changes or drilling parameter changes so as to accommodate the use of more efficient PDC bits and less over-designed downhole equipment in order to achieve an improved net ROP.

This improved drilling practice may be highly advantageous in drilling exploratory wells. An advantage of this invention over prior art methods is that, as discussed above, it may more readily facilitate use of PDC bits in lieu of the previously favored roller cone bits in exploratory and other wells which may have complex or uncertain formation properties, thereby improving the ROP. In addition, to facilitate improved ROP this invention may improve the selection of any other type or grade of more efficient bit or mill, including PDC, roller cone, blade, reamer, under-reamer or other cutter, than otherwise may have been selected without the benefit of acoustically looking ahead of the bit to identify hazards. Other bit options for enhancement may include bit tooth, button or cutter material, shape and hardness. This invention may thus accommodate the prudent design and/or selection of a more aggressive, faster penetrating bit for drilling the majority of the hole through utilization of acoustic projection technology to appropriately assess the nature of the identified drilling hazards. In addition, timely adjustments to other drilling parameters may also be made to accommodate a given bit and drilling assembly. For example, in order to accommodate use of PDC bits for drilling in areas of increased geologic uncertainty, drilling parameters such as the revolutions per minute (RPM), weight on bit (WOB) and downhole assembly design may be adjusted periodically while drilling. The result should be improved ROP, hole quality and drilling efficiency.

Identification of the existence, location and relative size of hazards such as hard streaks, coal seams, faults, salt sections, over pressure zones, gumbos and swelling clays may be beneficially identified and evaluated before they are encountered by a bit in order to safely and efficiently maximize ROP. For example, acoustic visualization of hazardous features which may lie ahead of the bit within a planned well path may also facilitate changing from an aggressive PDC bit to a less efficient hard-rock roller cone bit when encountering hard stringers. In the event a bit change is made, related drilling parameters may also be modified to accommodate the new bit type and revised drilling plan.

As stated previously, in addition to the methods of this invention facilitating ROP improvements while the well is drilling, consideration in the planning stages for use of the methods of this invention may also increase ROP, which may beneficially impact a drilling program such as enhancing rig scheduling and tool usage through reduced trips, number of bits and rig time required to drill the well. Other related enhancements from this invention which may be employed in the planning stages of the well to improve ROP include designing the size, amount and type of downhole equipment such as drill collars, mills and/or reamers, the necessity for and sizing of downhole motors, stabilizers, jars, rotary torque requirements and anticipated rotary speed.

A feature of this invention is the ability to increase bit life, thus minimizing the required number of bits required to drill a given hole section and also reducing the number of trips which must be made out of the hole to change to a new or different bit. The net effect is to increase ROP by reducing premature wear of the bit and reducing non-drilling rig time.

An additional feature is a reduction or prevention of occurrences of premature bit failures. Bit failures may often result in "fishing" operations to remove bearings or other debris from the hole before a new bit may be run. Bit failures result in increased bit costs and increased trip time to change the bit. Reduction or elimination of bit failures may also result in increased ROP through timely prediction of drilling hazards facilitating adjustments in drilling equipment or parameters so as to avoid destruction or accelerated wear of the bit.

Cumulative incremental benefits which impact ROP may thus be obtained from refinement of drilling parameters through use of this invention in both the pre-drill planning stages of the drilling program as well as the timely on-site detection and evaluation of drilling hazards identified while drilling such that the result is an improved net ROP as compared to the net ROP that may have otherwise been possible without the invention. The combined effect of these improvements upon ROP should result in enhanced economic and mechanical drilling efficiency. These and further objects, features and advantages of the present invention will become apparent from the following detailed description, wherein reference is made to figures in the accompanying drawings.

DETAILED DESCRIPTION OF THE PREFERRED METHODS AND EMBODIMENTS

Figure 1:
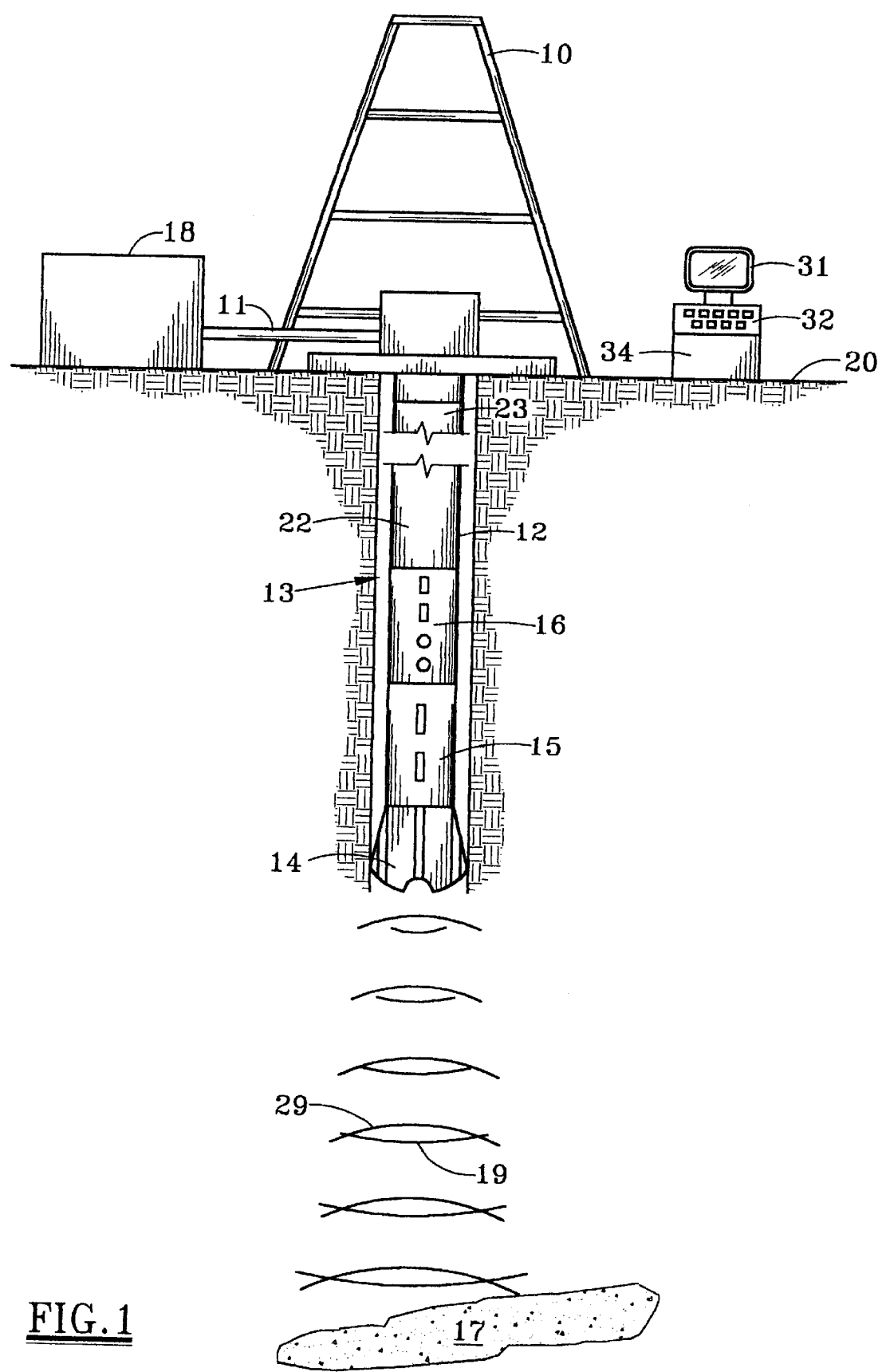
FIG. 1 is a schematic representation of an embodiment of an apparatus in accord with the present invention including a drill string and an acoustic system for improving rate of penetration by looking ahead of the bit.

Referring now to the drawings and more particularly to FIG. 1, which generally depicts a drilling rig 10 and related components, including an acoustic system 15 as may be used with the method of this invention. A typical drill rig 10 on the surface 20 may include, among other components, a mud line 11 attached to a mud pump 18 which may be attached to a drill string 13. A drill string 13 may include an allocation of drill pipe 23 and drill collars 22 as desired and may also include measurement while drilling (MWD) tools 16, an acoustic system 15 containing an integrated acoustic transmitter and receiver, and may also include a downhole mud motor (not shown) appropriately placed in the drill string 13 to rotate a bit 14. The drill string 13 may also include or may be attached to a drill bit 14. In a generally preferred embodiment for maximizing ROP the drill bit 14 may be a PDC bit. In other embodiments the drill bit 14 may include roller cone bits, blade bits, reamers and mills (not shown), and may include drill bits 14 which include integrated MWD components or acoustic transducers. The bit 14 excavates the borehole 12 through formations (not shown). The acoustic system 15 may send a first acoustic signal 19 and receive a second acoustic signal 29 and in so doing, following processing and analysis of the acoustic signals 29, may identify a hazard 17 that may be ahead of the bit 14. The analysis may also determine a relative direction and distance from the bit to an acoustically reflective feature or interface of the hazard 17. A drilling hazard 17 may not necessarily be dangerous or inherently destructive to drilling equipment but rather may be any geologic or environmental feature which could potentially impose detrimental effects upon ROP, drilling system performance, hole quality or drilling equipment, including those effects which may be inherently destructive. A formation may include any substantially homogenous section of material through which a borehole may be excavated or which may be otherwise investigated or measured, such that any time a heterogeneity in characteristics of formation material is encountered, including a change in acoustic impedance, pore volume or fluid saturation, it may be held that a new formation is thus encountered. The terms "reflected" and "acoustic reflection" as used herein may include any alteration, response, refraction, delay or acceleration of a first acoustic signal which impacts or interacts with an interface to result in a revised signal or second signal sensed by the transducer. During drilling operations, components of the drilling rig 10 may impart rotation in the drill string 13, which may in turn impart rotation in the bit 14 to excavate a borehole 12. In other embodiments, the drill string 13 may not rotate the bit and may contain a downhole motor, generally near the bit, which may be powered by the mud pump 18 at the surface 20. The mud pump 18 may hydraulically power the downhole mud motor (not shown), thereby imparting rotation in the bit 14. As drilling by the bit 14 progresses from the surface 20, it is important to know if and when the bit 14 may encounter a hazard 17, especially if the bit 14 is a PDC bit. The acoustic system 15 may be used to propagate first acoustic signals 19 ahead of the drill bit 14. As reflected second acoustic signals 29 may then be received by the acoustic system 15 and then processed downhole, the data or information may be transmitted to the surface 20 as a third signal by a known form of telemetry, or alternatively to a computer or a similar device (not shown), where the data or information may be further processed in order to identify the presence, type, range and/or direction to a potential drilling hazard 17 which may detrimentally impact ROP. In a preferred embodiment, the acoustic system 15 may not be used while the bit 14 is actively drilling due to the increased background acoustic noise generated by the bit 14 and because of poor acoustic coupling from the bit into the formation. Other embodiments of this invention may utilize acoustic energy signals 19 generated while actively drilling, either by a signal generator in the acoustic system 15 or by the natural interaction of the bit 14 with the formation. In the preferred embodiment, the acoustic system 15 and methods of this invention can be used while drill bit 14 rotation may be temporarily interrupted, as for example when an additional joint of drill pipe 23 is being connected to the drill string 13, thereby limiting the down-time required for making acoustic measurements. The acoustic system 15 should be able to "look ahead" of the bit 14 up to 100 meters (as shown in FIG. 1) and detect the relative position and nature of a hazard 17 that may have a thickness of at least 1 meter.

Once a potential hazard 17 may be identified, a timely, prudent decision may be made and an appropriate response implemented. For example, one such response may be to change to a different bit type, such as from a PDC bit to a roller cone. Another response may be to decrease the WOB, TOB and/or RPM of the bit 14 in order to prevent damage to the bit 14. Other appropriate responses may include one or more of other actions, including drilling assembly configurations, downhole motor or drilling technique such as changing from "constant weight" drilling to "time" drilling.

Another aspect of the preferred embodiment is to use the acoustic system 15 to find the range and direction from the bit 14 to a potential hazard 17 so as to identify the relative position of the hazard 17 in relation to the bit 14 and planned drill path. This information may then facilitate drilling at an improved ROP until the hazard 17 may be encountered. To provide this information in a display format, the acoustic system 15 may propagate acoustic signals 19 ahead of and surrounding the bit 14. After being received through a receiver design or arrangement and then processed, a determination of the range and direction to the hazard 17 may be projected from known techniques and characteristics of acoustic signals 29. Once the range and location of the hazard 17 are determined, drilling may proceed at maximum safe ROP until change in bit 14 or other drilling parameter adjustment is required in response to approaching engagement with the hazard 17. As discussed previously, timely detection and evaluation of drilling hazards 17 may also reduce bit 14 failures and increase bit 14 life, both of which may improve the net ROP in drilling a well.

An embodiment of a tool providing an acoustic system 15 as may be used by the methods of this invention is disclosed in U.S. Pat. 5,798,488 hereby incorporated by reference. In this tool embodiment, a bit 14 may be engaged directly with an acoustic system 15. The acoustic system 15 may contain an integrated acoustic transducer, which may generate and propagate acoustic signals 19 outwardly from the bit and into the formation. The acoustic transducer may also receive reflected acoustic signals 29. The acoustic system 15 may contain a compliant section which may allow the WOB to be varied as required for acoustic measurement and provide an acoustic isolation between the acoustic transducer and the drill collars 22, thereby reducing the amount of acoustic energy which may be undesirably propagated along the drill collars 22 and drill pipe 23.

Figure 2:
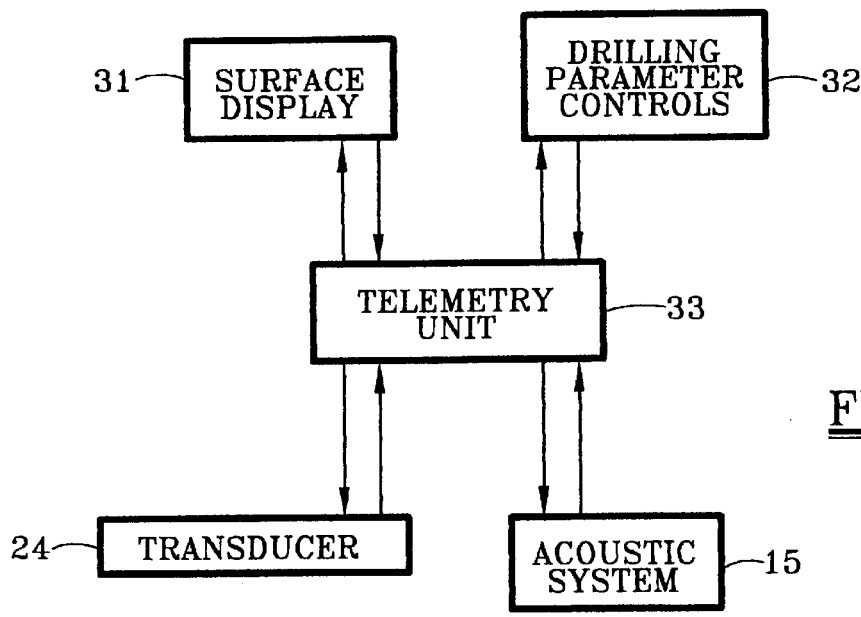
FIG. 2 is a schematic diagram showing basic functional elements of the current invention.

The flow chart in FIG. 2 illustrates a general overview of the system of the current invention. Referring to FIG. 1 and FIG. 2, in a preferred embodiment, while rotation of the bit 14 may be temporarily interrupted, the acoustic system 15 may propagate an acoustic signal 19 through the formation. In a preferred embodiment, these signals may be propagated ahead of the bit, generally in the direction of the well path. As the signal 19 may encounter changes in acoustic impedance, portions of the signal may be reflected back to and received by an acoustic transducer 24 where the signals may be measured, recorded, processed, transmitted and/or stored. Various drilling hazards 17, such as hard stringers, soft stringers, over pressure zones, coal seams, facies changes, faults and obstructing intrusive bodies may reflect acoustic signals 19. Received acoustic signals 29 may be transmitted by telemetry unit 33 to a computer or processor 34 and then to a display device 31 at the surface 20. The display 31 may illustrate the type of hazard, range, direction, shape and/or magnitude of risk such as projected hardness and related characteristics pertaining to the hazard 17. The information may then be evaluated and a decision on a course of action made and implemented, such as changing a PDC bit to a roller cone bit, or changing a drilling parameter appropriately in response to the hazard.

Figure 3:
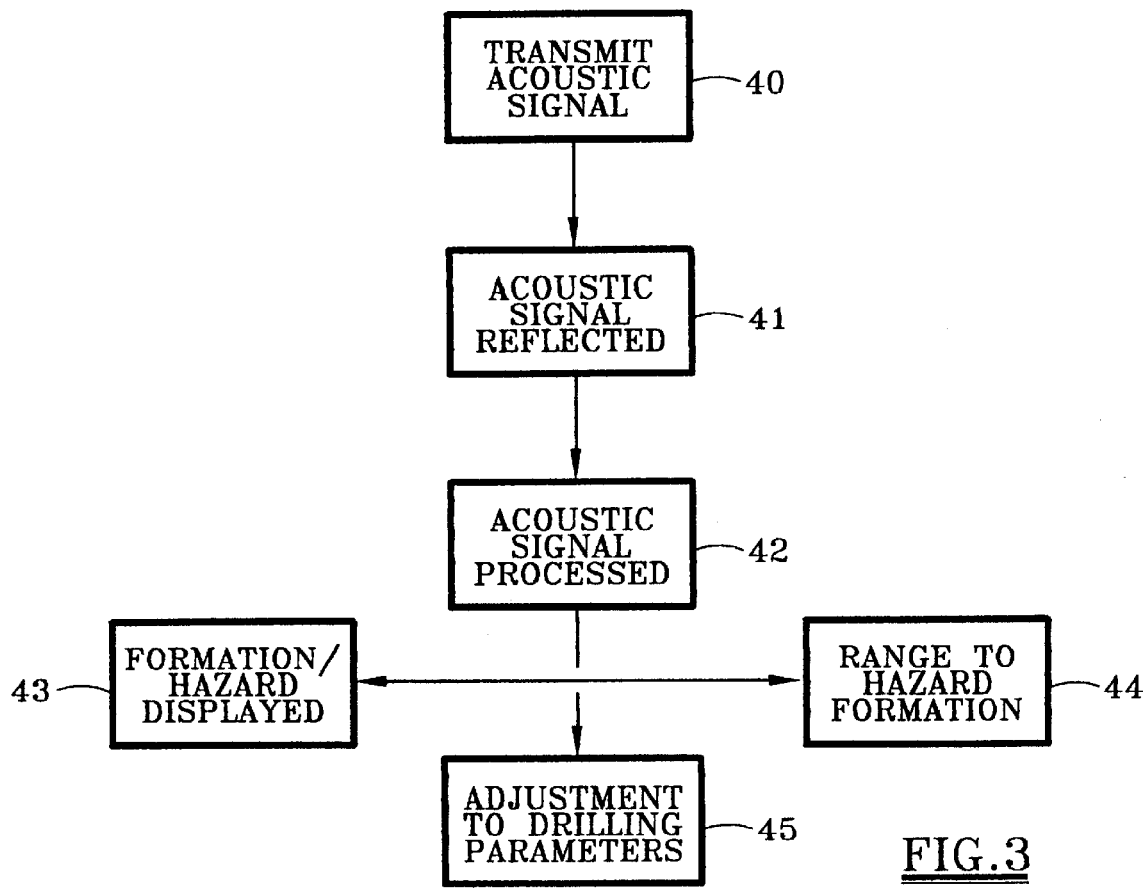
FIG. 3 is a flow chart of a method of the present invention using an acoustic system to detect the type, range and direction to a drilling hazard that may be ahead of the drill bit.
Figure 4:
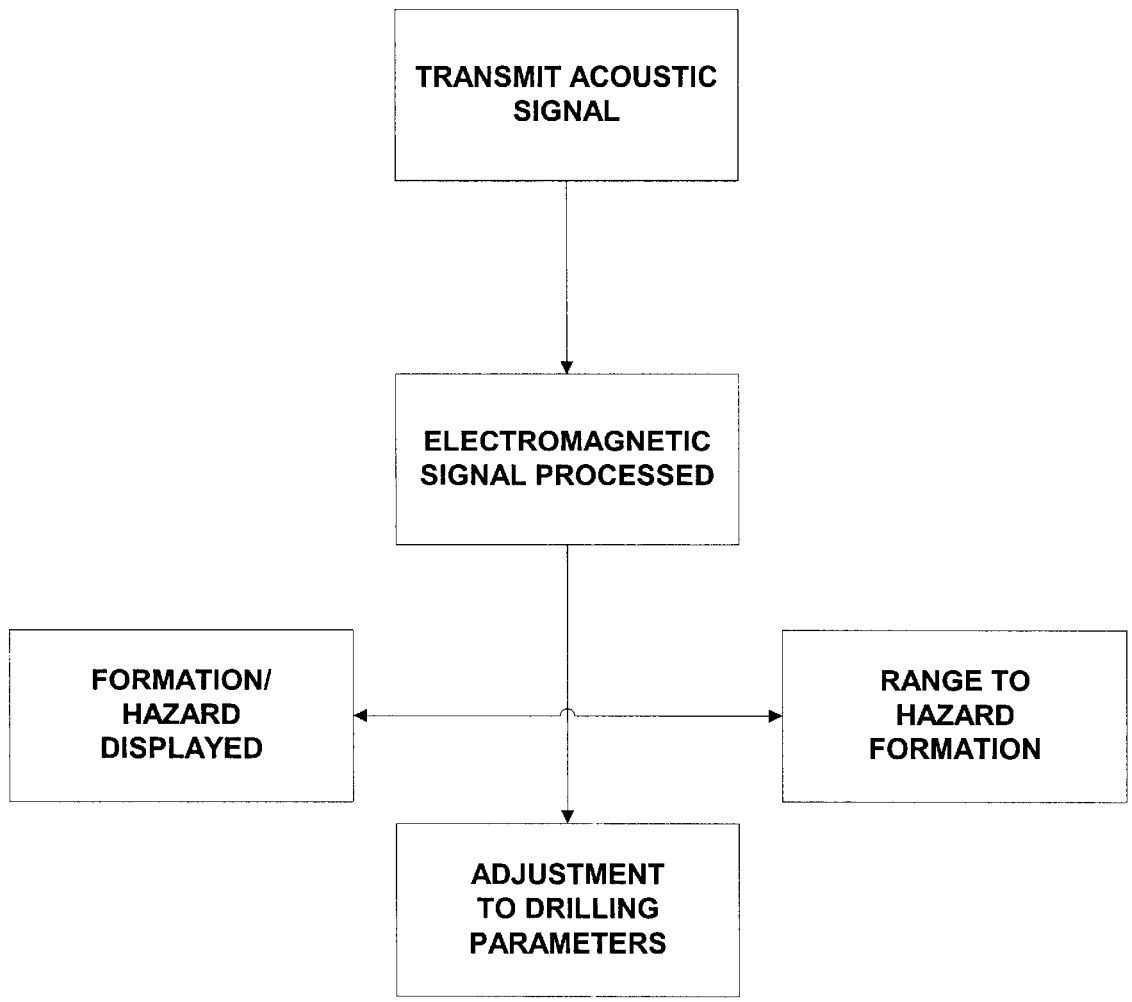
FIG. 4 is a flow chart of a method of the present invention utilizing an electromagnetic system to detect the type, range and direction to the drilling hazard.

The flow chart of FIG. 3 displays a general outline of one method embodiment of the current invention. Referring to FIGS. 1 and 3, the first step 40 in the method is to transmit a first acoustic signal generated by the acoustic system 15 into the formation. The acoustic system 15 may contain both an acoustic transmitter and an acoustic receiver. The first acoustic signal 19 may be reflected by step 41 as a second acoustic signal 29 by an acoustically reflective formation or hazard 17 ahead of the bit 14. The second acoustic signal 29 may be received by the acoustic system 15 and a third signal which is functionally related to the second acoustic signal 29 may be transmitted to the surface 20 using a known telemetry system 33 (see FIG. 2) in order that the third signal may be processed at step 42 at the surface 20, e.g., using computer 34. In processing, the third signal may be compared to the acoustic signatures of known formations and hazards 17 that may have been previously identified and stored on a disk, in a computer or other method of storage. When a signature match is obtained and the hazard 17 identified, this information may be displayed at step 43. Alternatively, a responsive action may be taken without any display. Known algorithms and calculation techniques may also be employed in processing the data. Further, by employing known acoustic interpretation techniques, the "time of flight" can be used to calculate the range at step 44 to the formation, which may then be displayed. Calculations may also be performed, related to the compressional and shear wave characteristics of the acoustic wave. If desired, the bit 14 may be changed, such as removing a PDC bit and adding a roller cone bit, or other adjustments made at step 45 to the drilling parameters. Many of the drilling parameters such as WOB or TOB may be adjusted by the driller using controls 32. By using the steps outlined in FIG. 3, the net ROP may be improved as compared to the ROP that may have been achieved otherwise by using drilling techniques and/or equipment which do not have the information made available through the methods of this invention.

In alternative embodiments of the methods disclosed herein, processing of the reflected second acoustic signal 29 may alternatively be made downhole by the acoustic system 15 and a third signal may thereafter be transmitted to the surface for further processing and/or display. In addition, in any processing scenario, any number of known methods of interpretation and calculation may be performed during processing of the data so as to determine any of a variety of characteristics or properties concerning the investigated formation or hazards so as to beneficially impact the ROP and/or extend bit life.

FIG. 2 discloses the logical flow of signals and/or data between the basic functional elements of this invention, in one embodiment of this invention. The methods of this invention may integrate certain basic functional elements of the invention, which may include a surface display 31, control and alteration of drilling parameter controls 32, telemetry system 33, transducer 24, and the acoustic system 15. The acoustic system 15, which may include an acoustic generator and receiver, may transmit and receive data, and then transmit that data to a telemetry unit 33. The telemetry unit 33 may transmit a third signal to the surface where the third signal may be processed and displayed at 31, or the telemetry unit 33 may receive a signal from the surface and the telemetry unit 33 may communicate that signal to the acoustic system 15. In response to displaying processed data at the surface 31, a decision may be made automatically or manually, wherein a drilling parameter may be controlled or altered at 32, such as changing bits 14 to a PDC bit, or changing the weight on the bit or torque on the bit. The resulting change may then be displayed on the surface display 31. Drill parameter control 32 decisions may be evaluated and/or implemented manually, automatically or in some combination of both.

FIG. 3 discloses an embodiment of the present invention using an acoustic system to detect the type, range and direction to a drilling hazard which may lie ahead of the drill bit 14. An acoustic transducer may generate and transmit a first acoustic signal downhole along a lower portion of the drill string and may propagate the first acoustic signal outwardly from the drill bit and into the formations. The first acoustic signal may be reflected and/or refracted by a formation or hazard, as a second acoustic signal which may be received by an acoustic receiver or transducer, in response to the first acoustic signal. The second acoustic signal may be processed at 42, preferably at the surface or alternatively both downhole in the drill string and at the surface. In any processing embodiment, a third signal, which is functionally related to the second signal, may be transmitted to the surface by any known form of telemetry. The third signal may be further processed and/or compared to known acoustic signatures which may have been previously stored for access by the processor. The third signal may be analyzed to identify the existence of a potential hazard, determine the range and/or direction to a detected hazard 17, and determine the characteristic nature of the hazard, before the hazard may be encountered by the bit. The range, direction, type and/or characteristics of the hazard may be displayed at the surface. Adjustments to drilling parameters may be made automatically, manually or a combination of both methods, in response to the detected hazard, so as to result in an increase in ROP.

Altering one or more drilling parameters in response to a hazard in order to increase overall ROP may include changing from rotating the drill string to rotate the drill bit to sliding the drill string while powering one or more downhole motors to rotate the bit (slide drilling). Altering one or more drilling parameters may also include changing from slide drilling to rotating the drill string to rotate the bit, or changing from drilling with constant weight on bit drilling to constant ROP drilling (time drilling).

To supplement the decision making process pertaining to adjustments to drilling parameters, additional drilling parameter data may be displayed on the surface, including rock properties, MWD information, LWD information, weight on bit, bit rotational speed, direction and distance to identified potential hazards. Processing the third signal may involve processing compressional wave characteristics of the second signal, shear wave characteristics of the second signal and time delay characteristics of the second signal.

Additional embodiments of the methods of this invention may include any of a variety of algorithms, techniques and/or methods for predicting drilling hazards 17 which may impact the ROP, including generating acoustic signals 19 as a method to measure the bulk resistivity of the formation ahead of the bit 14 relatively the same depth of investigation as the reflective surface of a drilling hazard 17 or acoustical impedance change. Since resistivity is primarily a function of water saturation, calculated water saturation may be used, among other uses, to tighten error bands on acoustic and seismic-while-drilling pore pressure predictions, which in turn may be useful in increasing ROP. This method may rely upon acoustical reflections from an acoustical impedance interface, which lies ahead of the bit 14, such as a first surface of a hard stringer or other drilling hazard 17. That formations and fluids on each adjacent6 side of the interface may be stressed by energy from the acoustic waves 19. The difference in resistivity between the formations on each side of the interface may establish a dipolar layer, which when energized by acoustic waves 19 may cause fluids near the interface to oscillate or breathe through the pore space, relative to the fluid on the opposing side of the interface, which may also oscillate. These oscillations may create an oscillating streaming potential, thus creating a low frequency and hence long-range electromagnetic field that may closely correlate with the seismic returns. Measurement of electromagnetic signals from this magnetic field may be made using known instruments, including instruments which, together with transmitting, processing and displaying equipment may facilitate prediction of characteristic changes in formation properties ahead of the bit 14. These changes may be indicative of hard streaks or other drilling hazards 127, which may lie ahead of the bit 14. Although applicable to a wide range of formation types, this method may be of greatest benefit in measuring properties of relatively low acoustic velocity and relatively soft formations or hazards. This information may be utilized in conjunction with other acoustic interpretation so facilitate prudent decisions pertaining to bit 14 and other equipment selection, drilling parameter adjustments and drill path adjustments such that ROP may be increased relative to the ROP which may otherwise have been achieved without using such methods. Determination of pore pressure in a formation ahead of the bit 14, prior to encountering that formation may facilitate both safe penetration of the formation as well as enhance ROP through that formation.

What is claimed:

1. A method of increasing the rate of penetration when drilling a subterranean well through formations using a drill string including a drill bit, comprising:

generating an acoustic signal downhole along a drill string and propagating the acoustic signal outward into a formation;

inducing an electromagnetic signal in the formation in response to the acoustic signal;

receiving the induced electromagnetic signal downhole along the drill string;

transmitting a downhole signal functionally related to the electromagnetic signal to the surface;

processing said downhole signal to generate processed data; and altering one or more drilling parameters in response to the processed data.

2. The method as defined in claim 1, wherein processing said downhole signal includes calculating resistivity of the formation.

3. The method as defined in claim 1, further comprising:

comparing the processed data to known formation characteristics.

4. The method as defined in claim 1, further comprising:

displaying drilling parameters along with the characteristics of the processed data.

5. The method as defined in claim 1, wherein altering the one or more drilling parameters includes modifying the bit selection.

6. The method as defined in claim 1, wherein altering the one or more drilling parameters includes changing weight on bit while drilling.

7. The method as defined in claim 1, wherein altering the one or more drilling parameters includes changing rotary speed of the drill bit while drilling.

8. A method of increasing the rate of penetration when drilling a subterranean well through formations using a drill string including a drill bit, comprising:

generating an acoustic signal downhole along a drill string and propagating the acoustic signal outward into a formation; and inducing an electromagnetic signal in the formation in response to the acoustic signal;

receiving the induced electromagnetic signal downhole along the drill string;

transmitting a downhole signal functionally related to the electromagnetic signal to the surface;

processing said downhole signal to generate processed data indicative of at least one of pore preserve and resistivity of the formation; and altering one or more drilling parameters in response to the processed data.

9. The method as defined in claim 8, further comprising:

comparing the processed data to known formation characteristics.

10. The method as defined in claim 8, further comprising:
displaying drilling parameters along with the characteristics of the processed data.

11. The method as defined in claim 8, wherein altering the one or more drilling parameters includes modifying the bit selection.

12. The method as defined in claim 1, wherein altering the one or more drilling parameters includes at least one of changing weight on drill bit while drilling and changing rotary speed of the drill bit while drilling.

13. A method of increasing the rate of penetration when drilling a subterranean well through formations using a drill string including a drill bit, comprising:
generating an acoustic signal downhole along a drill string and propagating the acoustic signal outward into a formation;
inducing an electromagnetic signal in the formation in response to the acoustic signal;
receiving the induced electromagnetic signal downhole along the drill string;
transmitting a downhole signal functionally related to the electromagnetic signal to the surface;
processing said downhole signal to generate processed data; and
altering at least one of bit selection, weight on bit while drilling, and rotating speed while drilling in response to the processed data.

14. The method as defined in claim 13, wherein processing said downhole signal includes calculating resistivity of the formation.

15. The method as defined in claim 13, further comprising:
comparing the processed data to known formation characteristics.

16. The method as defined in claim 13, further comprising:
displaying drilling parameters along with the characteristics of the processed data.

\* \* \* \* \*